United States Patent
Doumi

(10) Patent No.: US 11,580,778 B2
(45) Date of Patent: Feb. 14, 2023

(54) VIDEO ANALYSIS FOR OBTAINING OPTICAL PROPERTIES OF A FACE

(71) Applicant: L'OREAL, Paris (FR)

(72) Inventor: Mehdi Doumi, North Plainfield, NJ (US)

(73) Assignee: L'OREAL, Paris (FR)

( * ) Notice: Subject to any disclaimer, the term of this patent is extended or adjusted under 35 U.S.C. 154(b) by 82 days.

(21) Appl. No.: 17/007,860

(22) Filed: Aug. 31, 2020

(65) Prior Publication Data

US 2022/0067344 A1 Mar. 3, 2022

(51) Int. Cl.
*G06V 40/16* (2022.01)
*G06T 7/90* (2017.01)
*G06V 10/25* (2022.01)

(52) U.S. Cl.
CPC .............. *G06V 40/162* (2022.01); *G06T 7/90* (2017.01); *G06V 10/25* (2022.01); *G06V 40/164* (2022.01); *G06V 40/166* (2022.01); *G06V 40/171* (2022.01)

(58) Field of Classification Search
CPC .... G06V 40/162; G06V 10/25; G06V 40/164; G06V 40/166; G06V 40/171; G06T 7/90
See application file for complete search history.

(56) References Cited

PUBLICATIONS

Sankaran et al., "Pose Angle Determination by Face, Eyes and Nose Localization", 2005 IEEE Computer Society Conference on Computer Vision and Pattern Recognition (CVPR'05)—Workshops (p. 161) (Year: 2005).*
International Search Report and Written Opinion dated Nov. 3, 2021 in PCT/US2021/047896, 14 pages.
French Preliminary Search Report and Written Opinion dated Jun. 29, 2021 in French Patent Application No. 2011194, 6 pages.
Chuan-Yu Chang, et al., "Automatic Facial Skin Defect Detection System", 2010 International Conference on Broadband, Wireless Computing, Communication and Applications, XP031800020, Nov. 2010, pp. 527-532.
Takahiro Naoki, et al., "Optimal Color Space for Quantitative Analysis of Shinny Skin", 2013 $6^{TH}$ International Conference on Biomedical Engineering and Informatics (BMEI), XP032570386, Dec. 2013, pp. 836-840.
Scott E. Umbaugh, et al., "Automatic Color Segmentation of Images with Application to Detection of Variegated Coloring in Skin Tumors", IEEE Engineering in Medicine and Biology Magazine, vol. 8 No. 4, XP011417833, Dec. 1989, pp. 43-52.

* cited by examiner

*Primary Examiner* — Qian Yang
(74) *Attorney, Agent, or Firm* — Oblon, McClelland, Maier & Neustadt, L.L.P.

(57) ABSTRACT

Disclosed is a system and method for obtaining optical properties of skin on a human face through face video analysis. Video of the face is captured, landmarks on the face and tracked, regions-of-interest are defined and tracked using the landmarks, some measurements/optical properties are obtained, the time-based video is transformed into an angular domain, and additional measurements/optical properties are obtained. Such optical properties can be measured using video in real-time or video that has been pre-recorded.

12 Claims, 19 Drawing Sheets

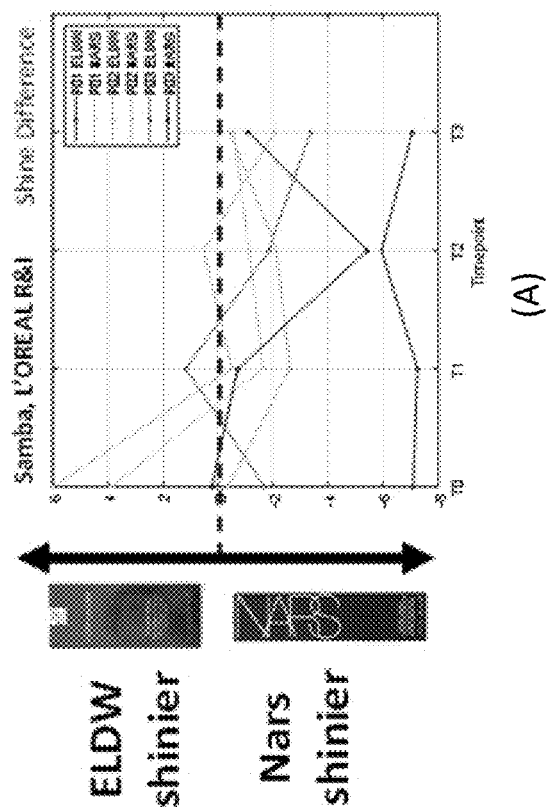
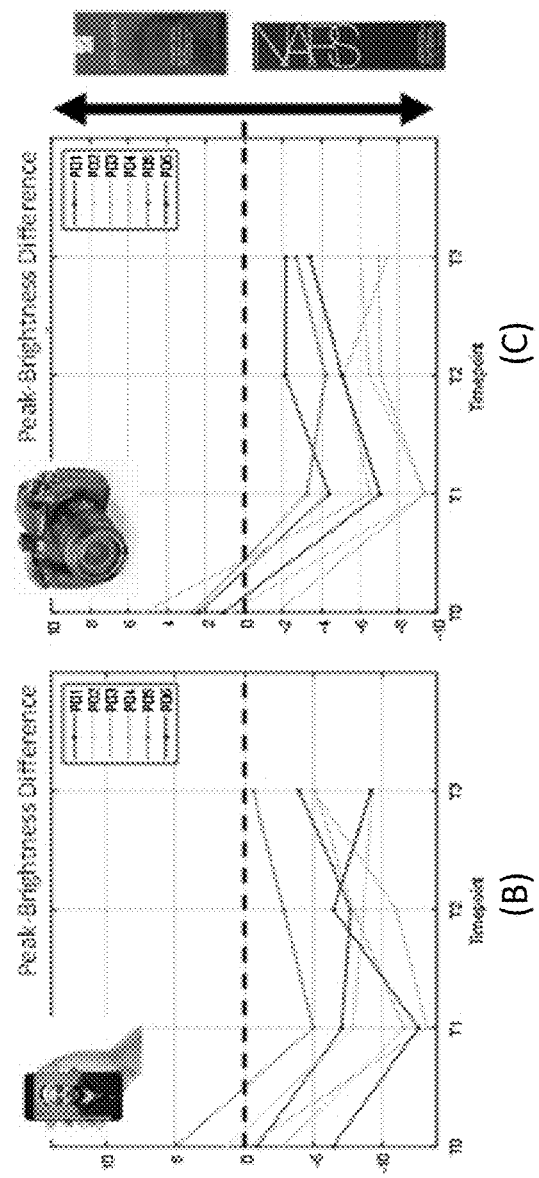
FIG. 12

Are ELDW and NARS Statistically Different?
[P-value, Yes/No]
P-value < 0.05 indicated statistically significant difference

| | Samba<br>T0-Normalized Shine Levels | Face Video System<br>iPhone self-acquired<br>Peak-Brightness Average Across 10 Zones | Face Video System<br>GH5 camera, tripod<br>Peak-Brightness Average Across 10 Zones |
|---|---|---|---|
| T0 (baseline) | 0.93, No | 0.68, No | 0.12, No |
| T1 (application) | 0.16, No | 0.0010, Yes | 0.0014, Yes |
| T2 (after 2 hours) | 0.049, Yes | 0.00211, Yes | 0.00091, Yes |
| T3 (after 5 hours) | 0.065, No | 0.0093, Yes | 0.0038, Yes |

FIG. 13

| Panelist ID | Blinding Code | Left Face | Right Face |
|---|---|---|---|
| 1 | 123 | ELDW | NARS |
| 2 | 321 | NARS | ELDW |
| 3 | 123 | ELDW | NARS |
| 4 | 123 | ELDW | NARS |
| 5 | 321 | NARS | ELDW |
| 6 | 123 | ELDW | NARS |

FIG. 14

VIDEO ANALYSIS FOR OBTAINING OPTICAL PROPERTIES OF A FACE

FIELD OF THE INVENTION

Embodiments described herein relate generally to a system and method for analyzing optical properties of skin.

BACKGROUND

Digital photographs have been the most popular medium for capturing and evaluating color, shine and morphology effects from cosmetic products. However, even the highest resolution images are not enough: they are static even though humans see the world in motion, they only capture one specific lighting condition, and image processing requires very rigid, standardized geometry to ensure reliable comparative analysis.

To combat that, scientists developed Machine Learning methods to improve photo-analysis, but they have limitations: they are "black boxes", require very large image sets, require very standardized data, train fastest with low-resolution images, and require very specific training objectives.

SUMMARY

In light of the above-mentioned problems, this disclosure describes a system and method for analyzing optical properties of skin, comprising: capturing video of the skin; tracking, from the captured video of the skin, one or more landmarks on the skin; identifying, from the tracked one or more landmarks on the skin, one or more regions-of-interest; transforming the captured video into an angular domain; and calculating optical properties of the skin.

In one embodiment, the optical properties include at least one of color, luminance, texture, shine, radiance, evenness, skin tone, iridescence, and glow.

In one embodiment, the video is captured from a handheld device.

In one embodiment, an environment is changed based on the calculated optical properties of the skin.

In one embodiment, the skin is on a face.

In one embodiment, the optical properties are calculated for a pre-existing video.

In one embodiment, the calculated optical properties of the skin are collected for data analysis.

BRIEF DESCRIPTION OF DRAWINGS

FIG. 12 shows a side-by-side comparison of shine/peak-brightness difference for three different acquisition types, where (A) is from a Samba polarized, (B) is a Face-Video system with self-acquired iPhone video, and (C) is a Face-Video system with Panasonic GH5 camera on a tripod.

FIG. 13 shows the statistical results from a Paired T-Test testing whether ELDW and NARS are found to be statistically different using results from the three different acquisition types.

FIG. 14 shows the actual products that were put on the left and right face for each panelist in the experiment, which were randomly assigned.

DETAILED DESCRIPTION

In one embodiment, this disclosure presents a system and method for evaluating optical properties (i.e. effects) of skin on a human face, such as (but not limited to) color, luminance, texture, shine, radiance, evenness, skin tone, iridescence, glow, etc. One approach is to (1) evaluate and (2) visualize optical effects by capturing video in a relaxed, real-life capture environment, and analyze it with software having facial-landmark detection capability. The disclosed technique can use video and dynamic movements of humans to quantify the optical properties of a human's face; the result is better sensitivity, robustness, and flexibility (don't need to use a high-end camera) when quantifying such optical properties.

Figure 1A:
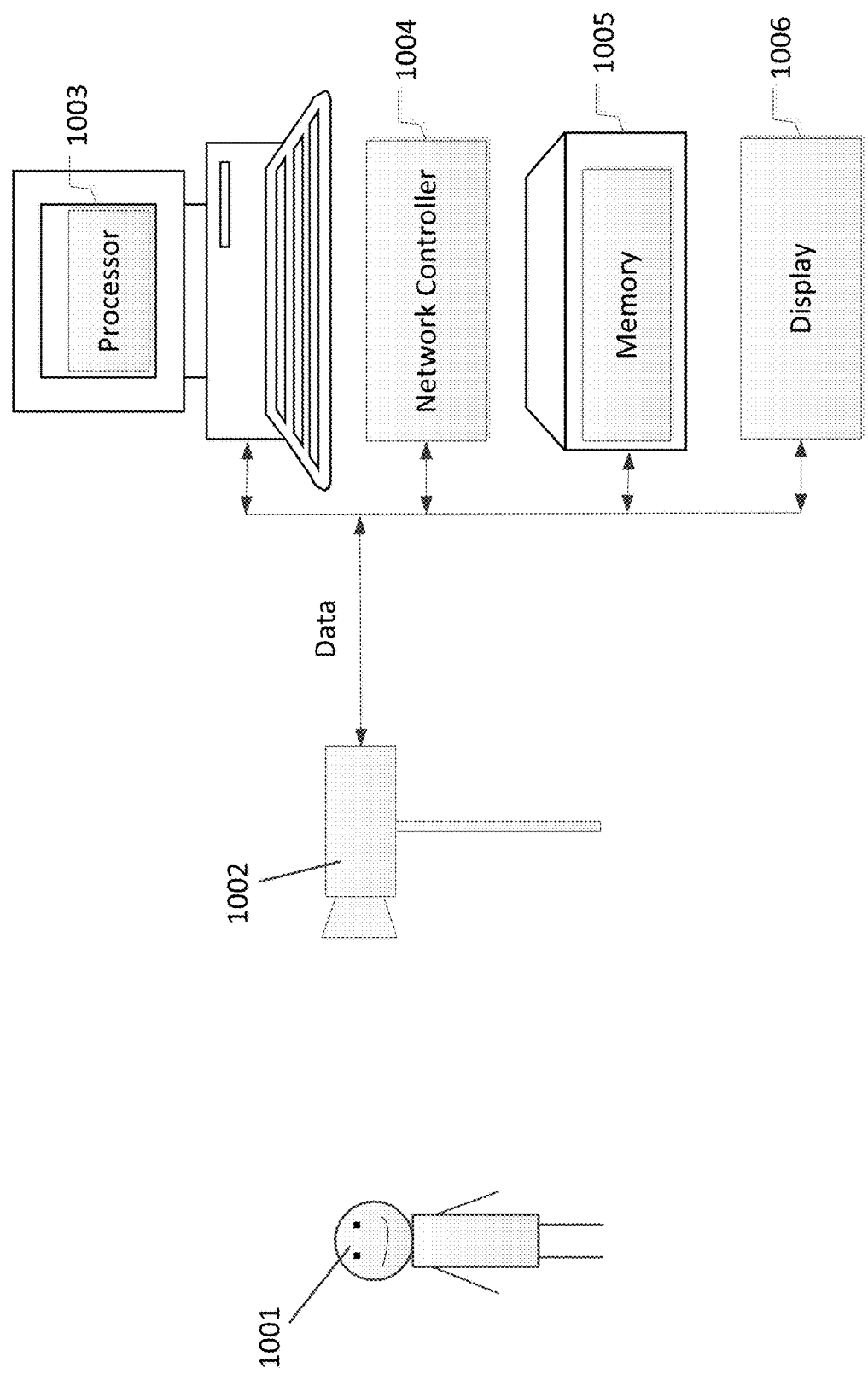
FIG. 1A is a system view of one potential setup, where a camera is used to capture video of a user's face, and the optical parameters of the face in the captured video are calculated locally, over a network, or with of combination of both.
Figure 1B:
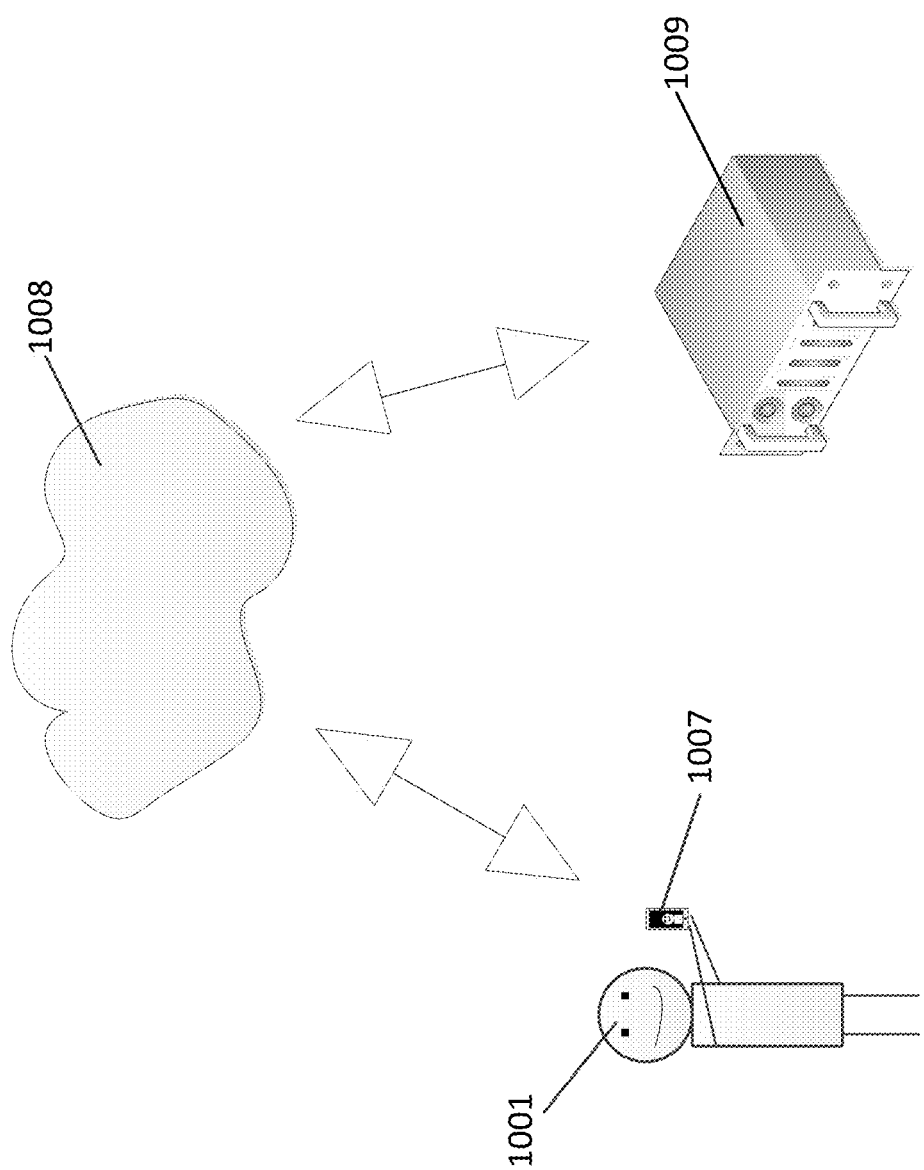
FIG. 1B is a system view of a second potential setup, where a phone is used to self-capture video and utilizes the cloud to process the video for optical parameters.

FIGS. 1A and 1B show system views for two exemplary embodiments. In FIG. 1A, a camera 1002, such as a digital single-lens reflex (DSLR) camera, can be used to record video of a face 1001. In one embodiment, the distance between the face 1001 and camera 1002 can be a normal distance between a person and a mirror when they are applying makeup. The captured video data can be sent to a processor 1003, network controller 1004, memory 1005, and/or display 1006. The processor 1003 can be used to process the captured video from the camera 1002 and perform calculations to determine optical properties. The network controller 1004 can be used to transmits and/or receive data over a network. The memory 1005 can be used to read and write data. The display 1006 can be used to visualize data, such as the processed (i.e. calculated) optical properties of the face 1001. In another embodiment, a light can be shone onto the face 1001 for better lighting. In another embodiment, a green screen can be placed behind the user's face 1001 to key-out the background for better visualization of the face 1001.

In FIG. 1B, a phone 1007 connected to the internet can be used to self-capture video of a face 1001. The self-captured video can be sent to the cloud 1008 (i.e. over a network). The self-captured video can be sent from the cloud 1008 to a server 1009 for processing. The server 1009 can calculate the optical properties of the face 1001 from the self-captured video, and send results back to the phone 1007 via the cloud 1008. In another embodiment, the cloud 1008 and server 1009 can be omitted, and the phone 1007 can locally (i.e. no internet connection required) calculated all the optical properties of the face 1001 from the self-captured video, and display the results for the user.

Figure 2:
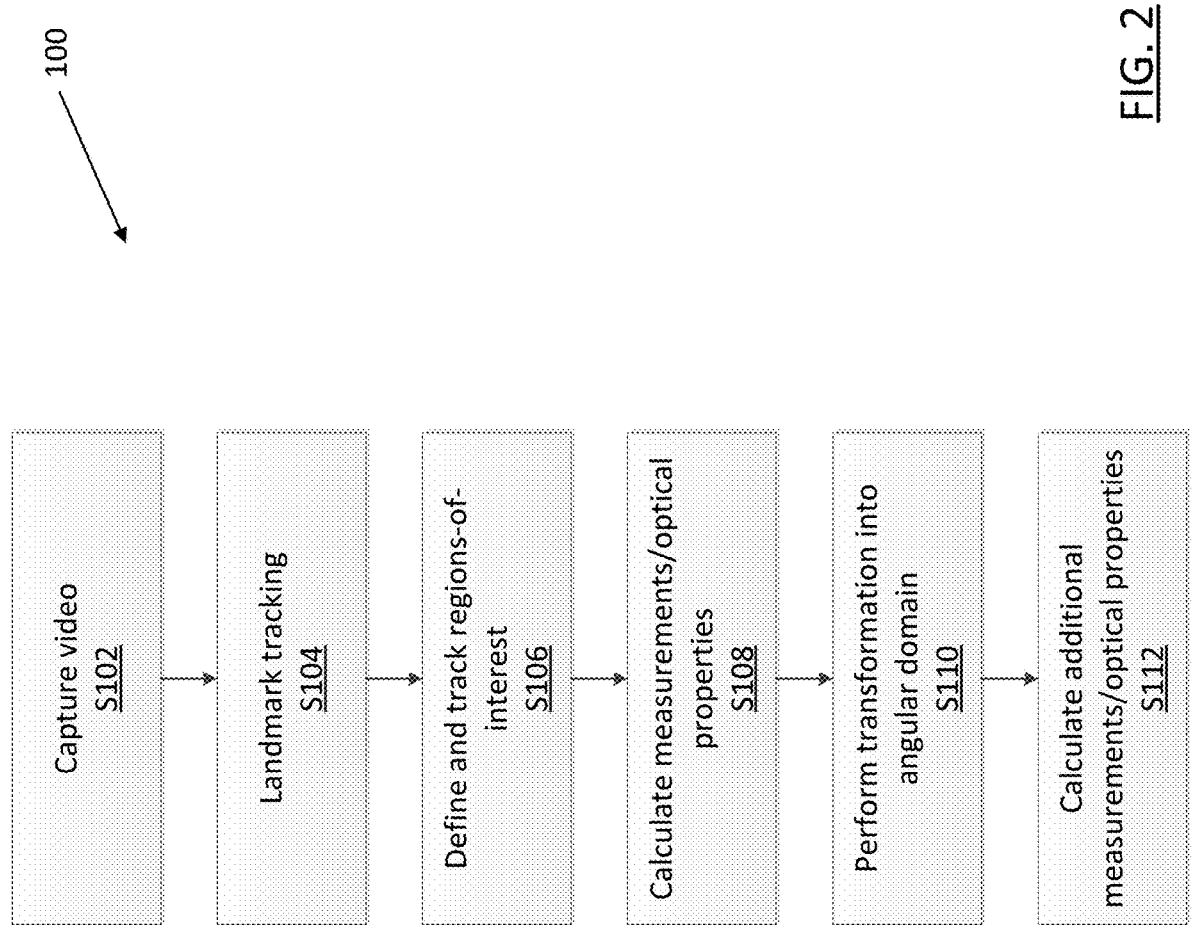
FIG. 2 is a flowchart outlining the steps to calculate measurements/optical properties in one embodiment.

FIG. 2 is a flowchart walking through an exemplary embodiment of one method 100. This method can be configured to processing circuitry.

Figure 3:
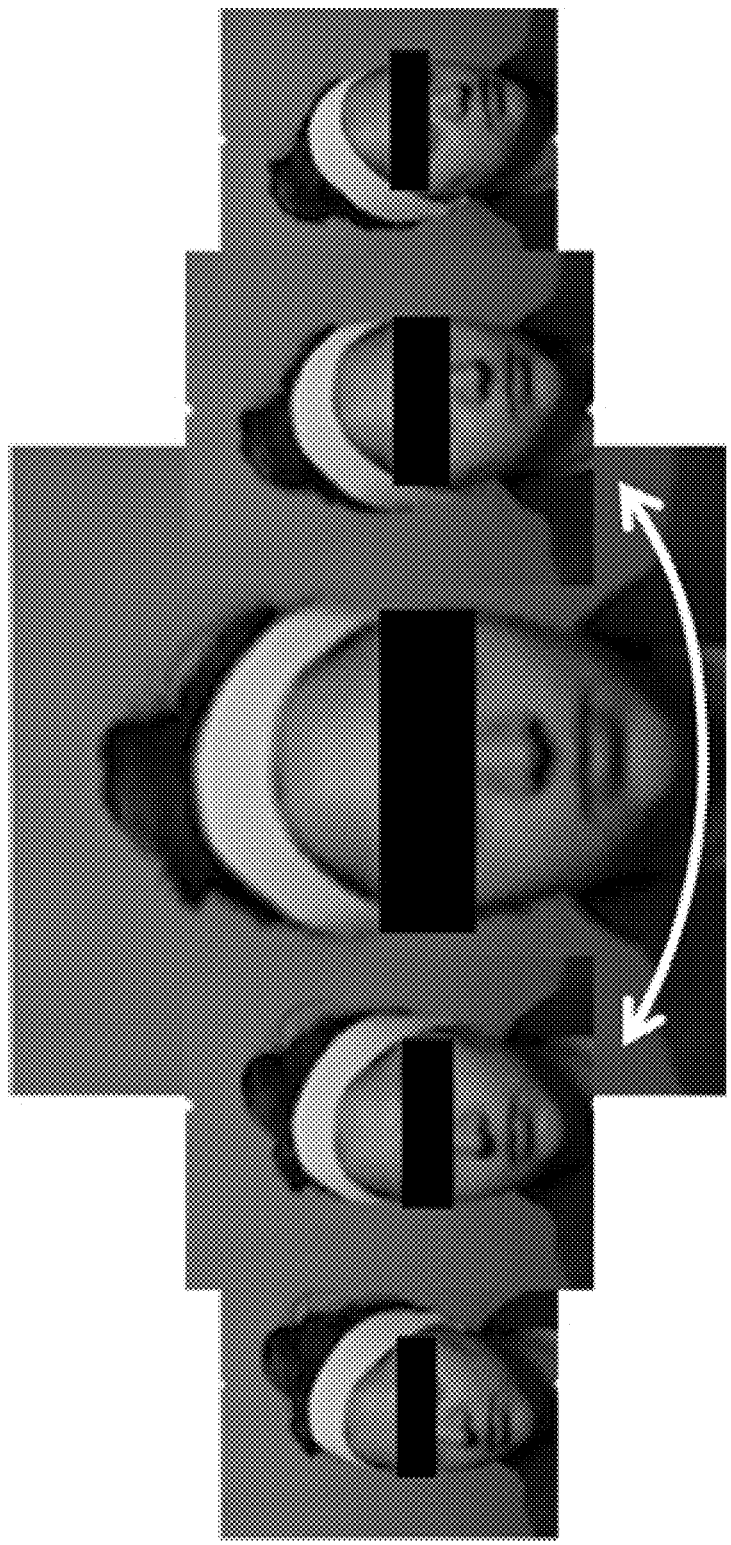
FIG. 3 illustrates frames from a captured video of a panelist moving their head.

In FIG. 2, S102 is to capture video. The captured video can be of a human face. In another embodiment, the captured video can be of skin elsewhere, such as the leg, arm, back, etc. Skin on a human face will be used in this example. The video can be pre-recorded or recorded in real time. In the recorded video, the human can move their head naturally (e.g. look to the left, center, right, and then repeat). The human can remove glasses and pull back the hair with a headband to optimize the facial tracking and minimize occlusion of the facial regions. FIG. 3 shows examples of some frames from a captured video. The video can be recorded from a device capable of video recording, such as a handheld device (e.g. smartphone, tablet, etc.), a webcam from a laptop, DSLR camera, etc.

In one embodiment, the video capture system can have one LED light, a DSLR on a tripod in line with the central axis of illumination, and a chair for the subject to sit on. Video can be recorded at 720p resolution (up to 4K) and 60 fps (max 120 fps). The subject can be instructed to move their head naturally for, in one embodiment, up to 60 seconds, and a minimum of 15 seconds during recording. In another embodiment, the subject can move their head for less than 15 seconds or over 60 seconds. In another embodiment, the DSLR and tripod can be replaced by a smartphone (e.g. iPhone), and the smartphone user can self-capture a video of their face. For in-store Customer Experience Visualizations, a computer vision (e.g. USB3Vision type) camera connected to a workstation can be used for real-time capture.

Figure 4:
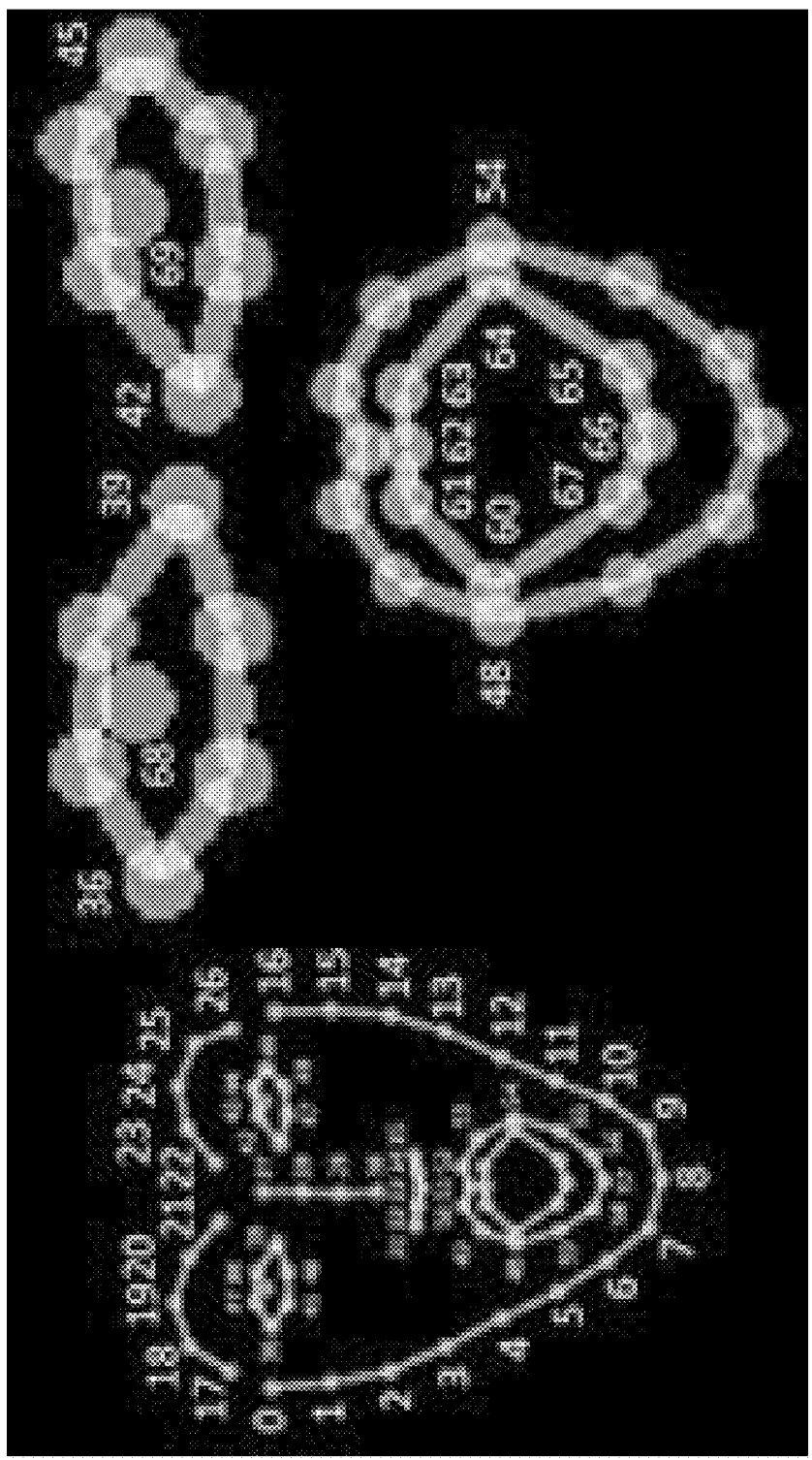
FIG. 4 is an example showing the landmarks that are tracked for each frame in one example.

In FIG. 2, S104 is landmark tracking. Video files (evaluation system) or the video-stream (real-time visualization) are read by facial landmark tracking software libraries. FIG. 4 shows an example of landmark tracking, where 70 point-locations on the face are detected for each video frame (e.g. center of pupil, corners of eyes, nostrils, etc.). In one embodiment, the amount of landmarks may be more or less than 70. The landmark data can include time of existence, strength of existence, x-position, and y-position. The data can be output into a comma-separated values (CSV) file.

Landmark tracking software is available in the open source library Dlib (https://github.com/davisking/dlib). An example of this landmark tracking can be seen in the OpenPose software developed by Carnegie Mellon (https://github.com/CMU-Perceptual-Computing-Lab/openpose).

Figure 5A:
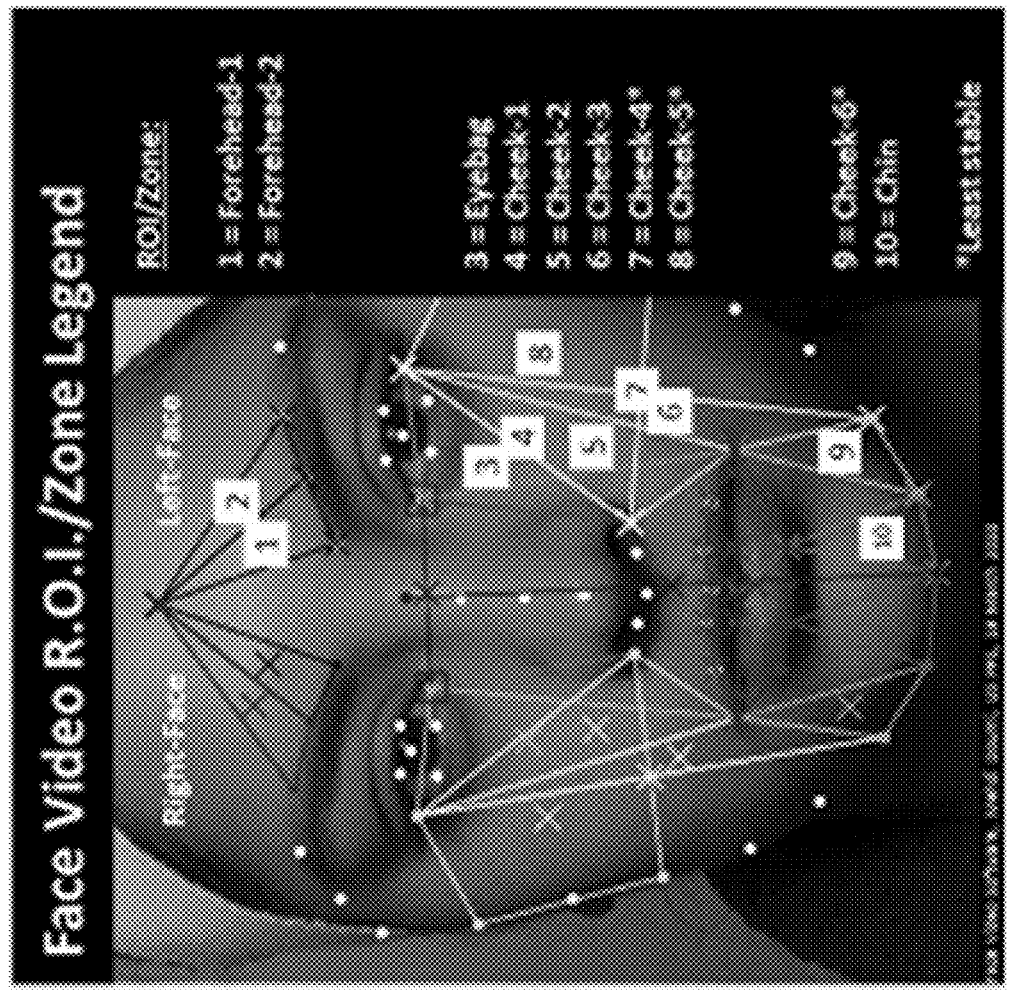
FIG. 5A is a first example showing regions-of-interest on a left and right side of a face at one head orientation, where the regions-of-interest were created using tracked landmarks.
Figure 5B:
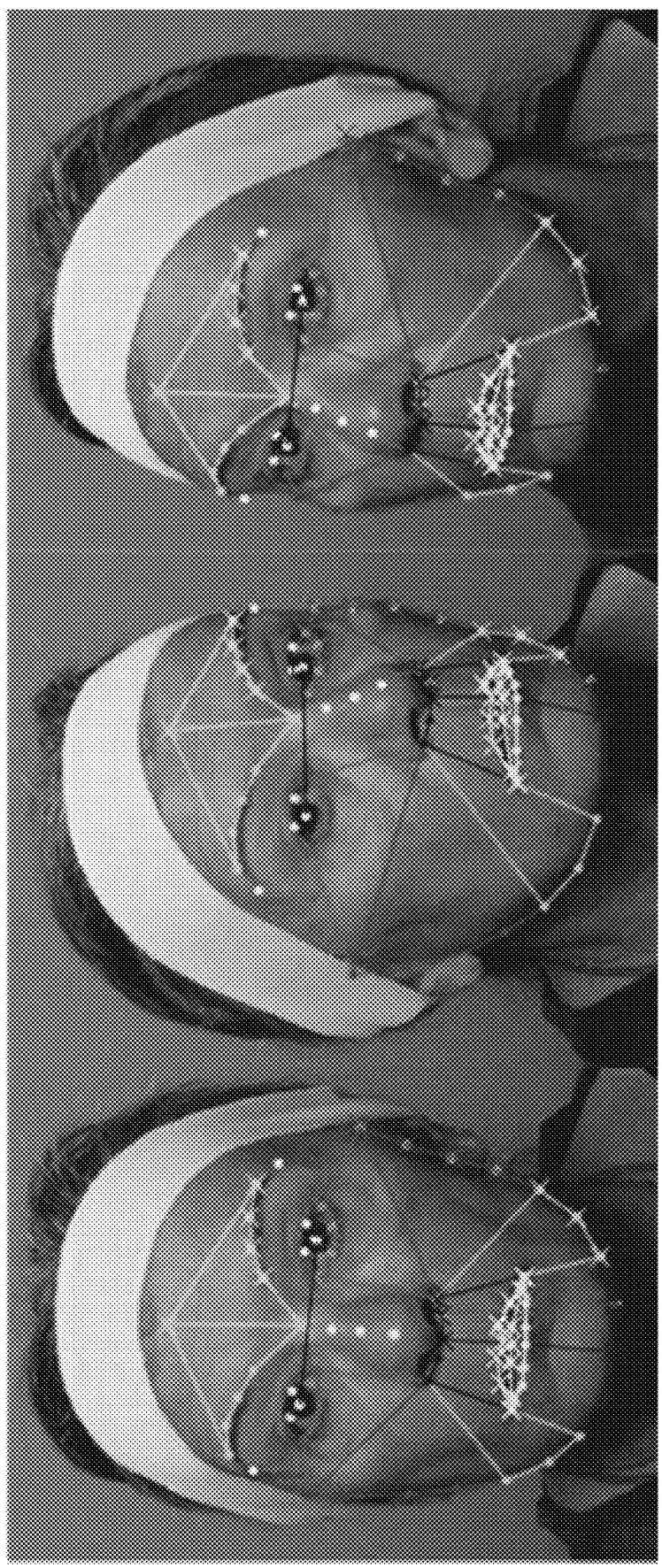
FIG. 5B is a second example showing regions-of-interest on a left and right side of a face at three different head orientations, where the regions-of-interest were created using tracked landmarks.

In FIG. 2, S106 is to define and track regions-of interest (ROIs). One or more regions-of-interest (i.e. patches or zones) on the face can be constructed using the tracked landmarks. Further, the captured video can be filtered to use only the best video frames (e.g. frames with clear ROIS, frames with a minimum number of landmarks, etc.). These ROIs/patches/zones can be defined as the most relevant location to a human perception. Their size and location can be informed by special perception studies, e.g. Pupil-Tracking studies to know where exactly a human pays attention on a subject's face. An example of S106 is shown in FIG. 5A and FIG. 5B, where the landmarks were used to create ROIs for multiple regions, such as the left and right forehead, eyebag, cheek, and chin.

Figure 6:
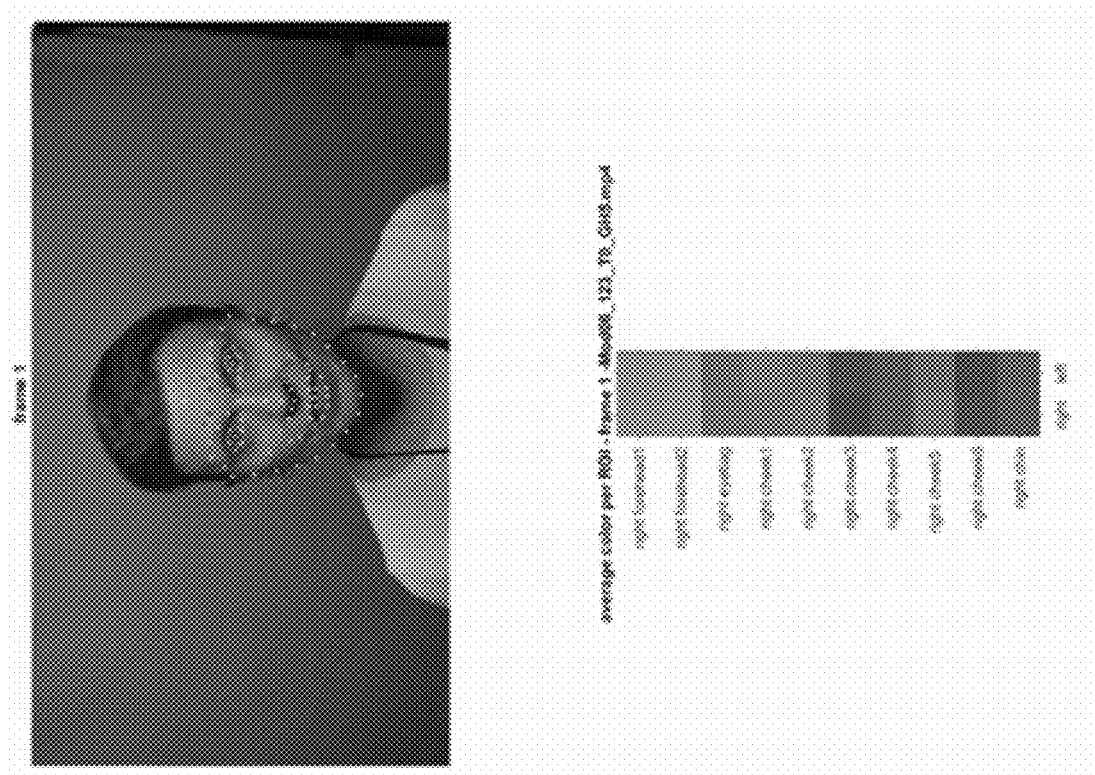
FIG. 6 is an example showing an optical property of skin on a face for one frame of a video, where the optical property is average color per region-of-interest.
Figure 7:
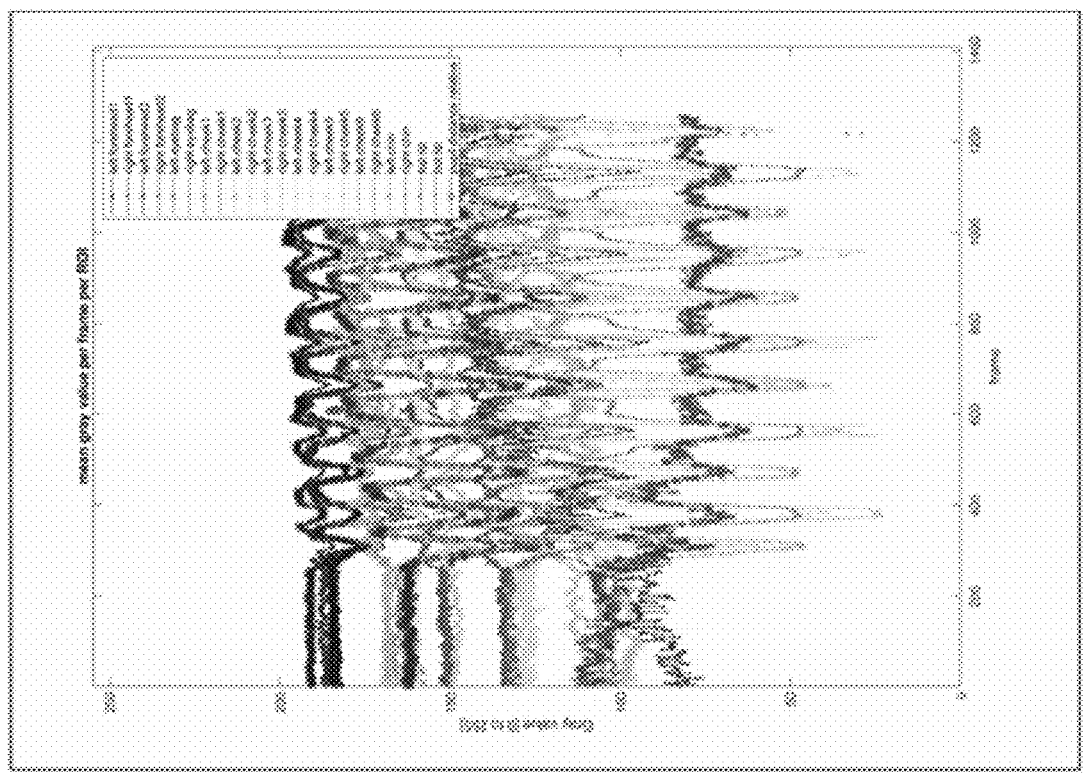
FIG. 7 is an example showing an optical property of skin on a face for multiple frames of a video, where the optical property is mean gray value per region-of-interest.

In FIG. 2, S108 is to calculate measurements/optical properties. For all (or some) of the ROIs, calculations for optical properties such as color, luminance (i.e. light), and texture can be performed. Averages, medians, upper and lower quartiles are computed from the set of RGB triplets contained within the ROIs to estimate the color (e.g. the average color of Forehead-ROI #2, at frame 12, is RGB= [180, 122, 80]). Luminance and brightness can be computed using similar functions after the RGB triplets are converted to single, 8-bit grayscale values, ranging from 0 to 255. Texture within each ROI can be computed using block-processing functions (or filters) like 2D standard-deviation, 2D entropy, and $1^{st}$ and $2^{nd}$ order derivatives, etc. FIG. 6 shows an example, where the average color per ROI, for each ROI, was calculated for one frame of the captured video. Additionally, FIG. 7 shows the calculated color and brightness over time for each ROI for each frame of the captured video.

Figure 8:
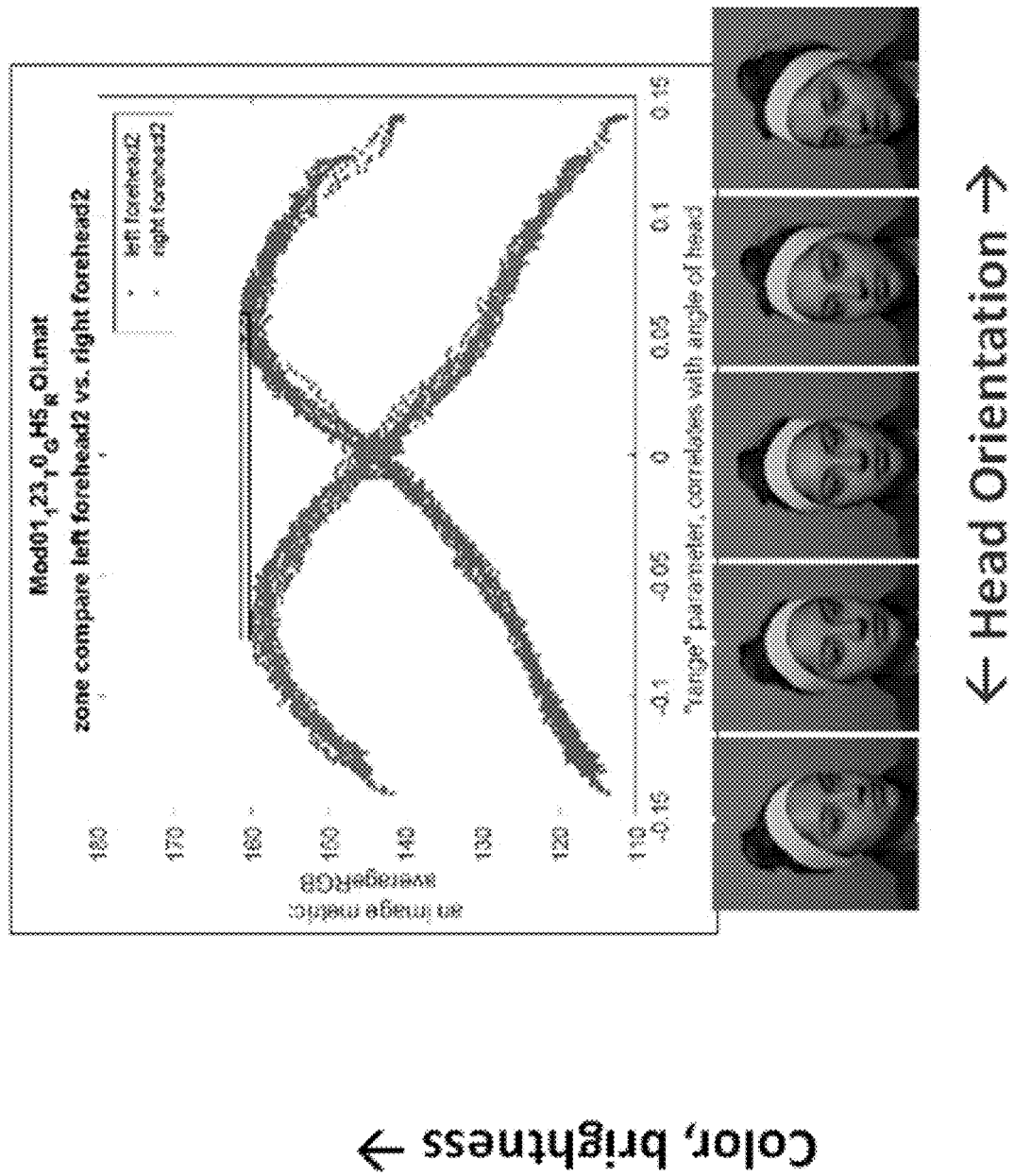
FIG. 8 illustrates an angular transformation, where an average RBG value is shown for a left forehead region-of-interest and a right forehead region-of-interest at varying head orientations/angles.

In FIG. 2, S110 is to perform transformation into an angular domain. The time-based color/light/texture data can be converted to an angular domain. This is accomplished by calculating the ratio of distances between left and right facial landmarks relative to central axis and solving for trigonometric equations; for example, as the head turns to the right, right-eye-to-nose distance can be observed to be much smaller than the left-eye-to-nose distance, so the angle can be estimated based on those distances. This allows production of results like: the color of the right cheek is RGB= [200,112,98] at a head rotation 22 degrees left-from-center. In other words, the calculated measurements can be remapped as a function of head-orientation, i.e. angle of 22°, as opposed to time, i.e. frame number 12. An example is shown in FIG. 8, where a left forehead ROI and right forehead ROI is mapped according to color/brightness (y-axis) and head orientation (x-axis). Note that in this example, a more negative x-axis value corresponds to the panelist's face turning more left, a more positive x-axis value corresponds to the face turning more right, and an x-axis value at zero means the panelist's face is centered.

In FIG. 2, S112 is to calculate additional—higher level—measurements/optical properties like shine, radiance, evenness, skin tone, iridescence, glow. After color and light measurements have been mapped to angular domain, higher-level analysis can be performed on the data, for example face "Shine" can be correlated to the "Peak brightness over the range of angles" in a video. In other words, as the human turns their head left and right, each ROI experiences a maximum brightness at some angle that maximizes the reflection of the light source, and this "peak brightness" grayscale value can differentiate between a non-shiny and shiny products. Iridescence, for example, is an optical effect where the color appears to change due to angle so the variability of the average color within each ROI can be tracked and quantified to estimate the color change. The other metrics can be determined by similar non-linear functions (i.e. max brightness over angle) that act on the angular domain, and the spatial domain (i.e. max brightness over all ROIs); and in the case of radiance and glow, regression models can be used to link a set of angular-based metrics to consumer-perception data and makeup-expert evaluation data.

In another embodiment, S110 can be performed prior to S108, and S108 and S112 can be performed together as one step after S110.

The above-mentioned method 100 was tested using a prosumer camera (Panasonic GH5), a handheld device camera (iPhone 8 front camera), and a differential polarization camera (Samba by Bossa Nova) using a peak-brightness/shine metric. The Samba can be considered state-of-the-art. For example, the Samba is the standard in vivo shine instrument at L'Oreal.

Six Caucasian female panelists wore two products on each half of their face. The products were (1) Estee Lauder Double Wear, 3W1 Tawny (known to be matte), abbreviated as ELDW, and (2) NARS Natural Radiant Longwear Foundation, Light 4.5 Vienna 6606 (known to be shinier than ELDW) abbreviated as NARS. Thus, in a peak-brightness/shine measurement, the NARS Foundation should have a higher peak-brightness/shine value than the ELDW. The panelists' faces were captured at baseline (T0), after application (T1), two hours after application (T2), and five hours after application (T3). Face-analysis software incorporating the above-mentioned method 100 was used to translate landmarks-per-frame into zone-per-frame, into metrics-per-frame.

Figure 9A:
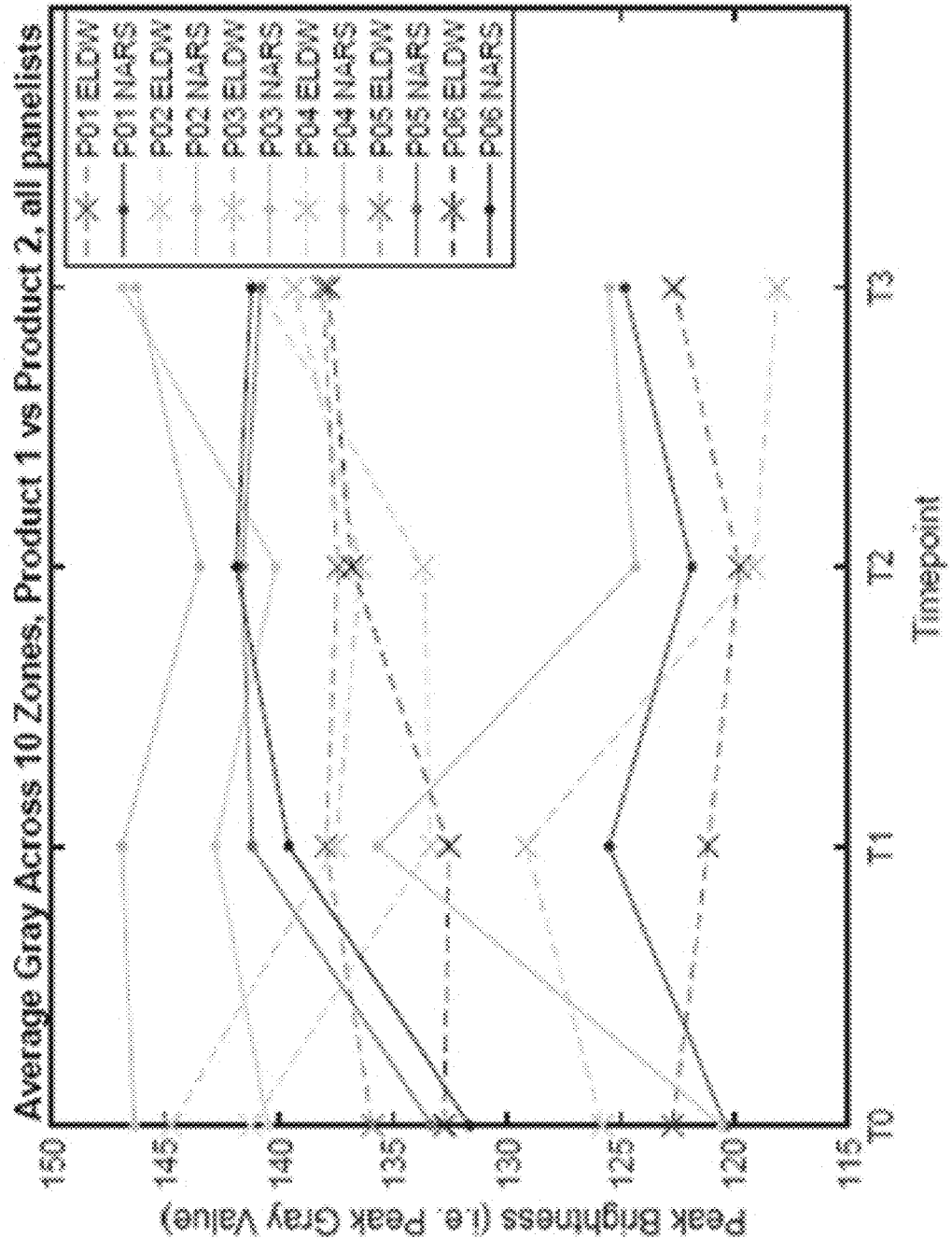
FIG. 9A shows the peak brightness versus timepoint graph obtained using a Panasonic GH5 camera for all the panelists in a study, where each panelist had a first product known to have a higher peak brightness (NARS) on one half of their face, and a second product known to have a lower peak brightness (ELDW) on the other half of their face.
Figure 9B:
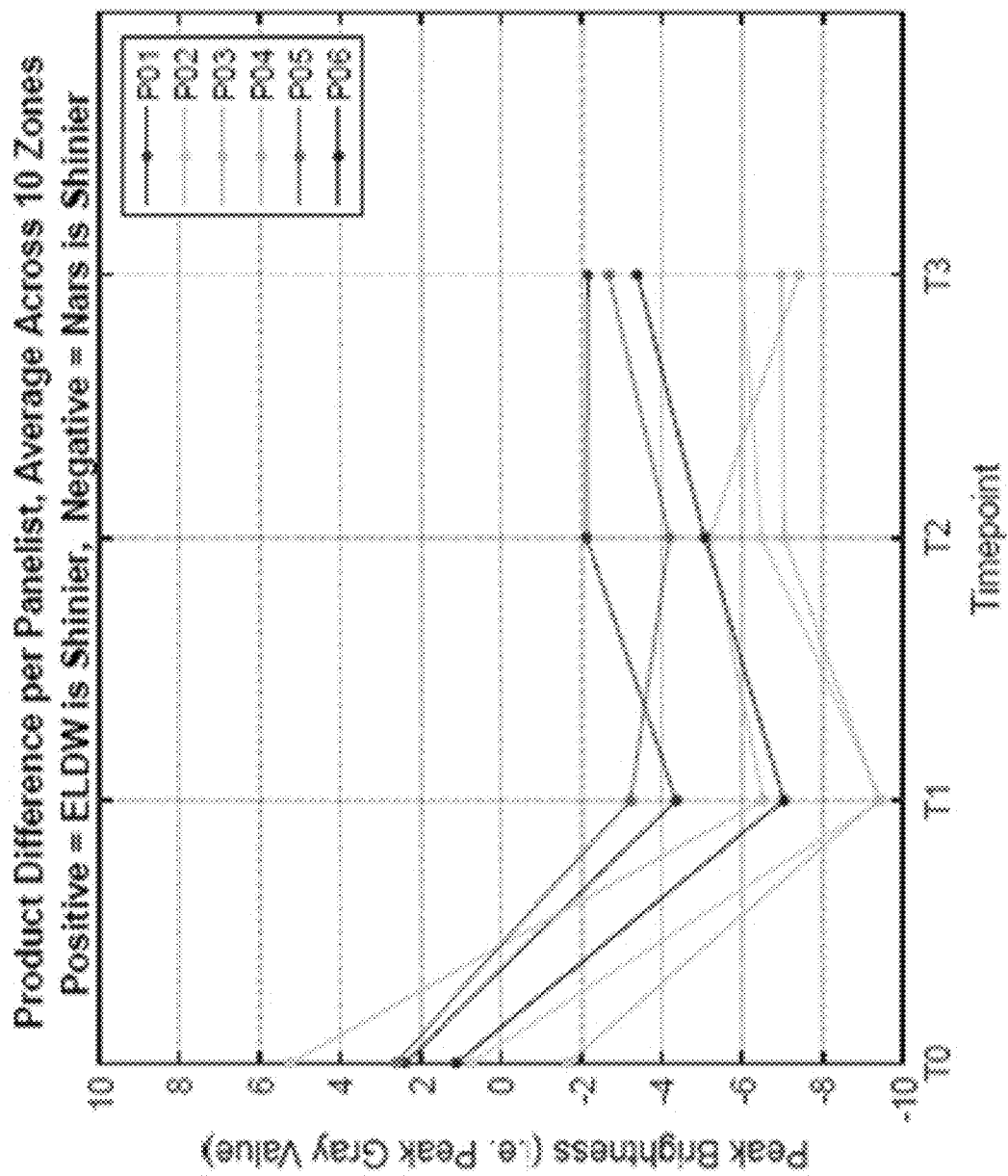
FIG. 9B shows a peak brightness product difference graph obtained using a Panasonic GH5 camera for all panelists in a study, where each panelist had a first product known to have a higher peak brightness (NARS) on one half of their face, and a second product known to have a lower peak brightness (ELDW) on the other half of their face.
Figure 10A:
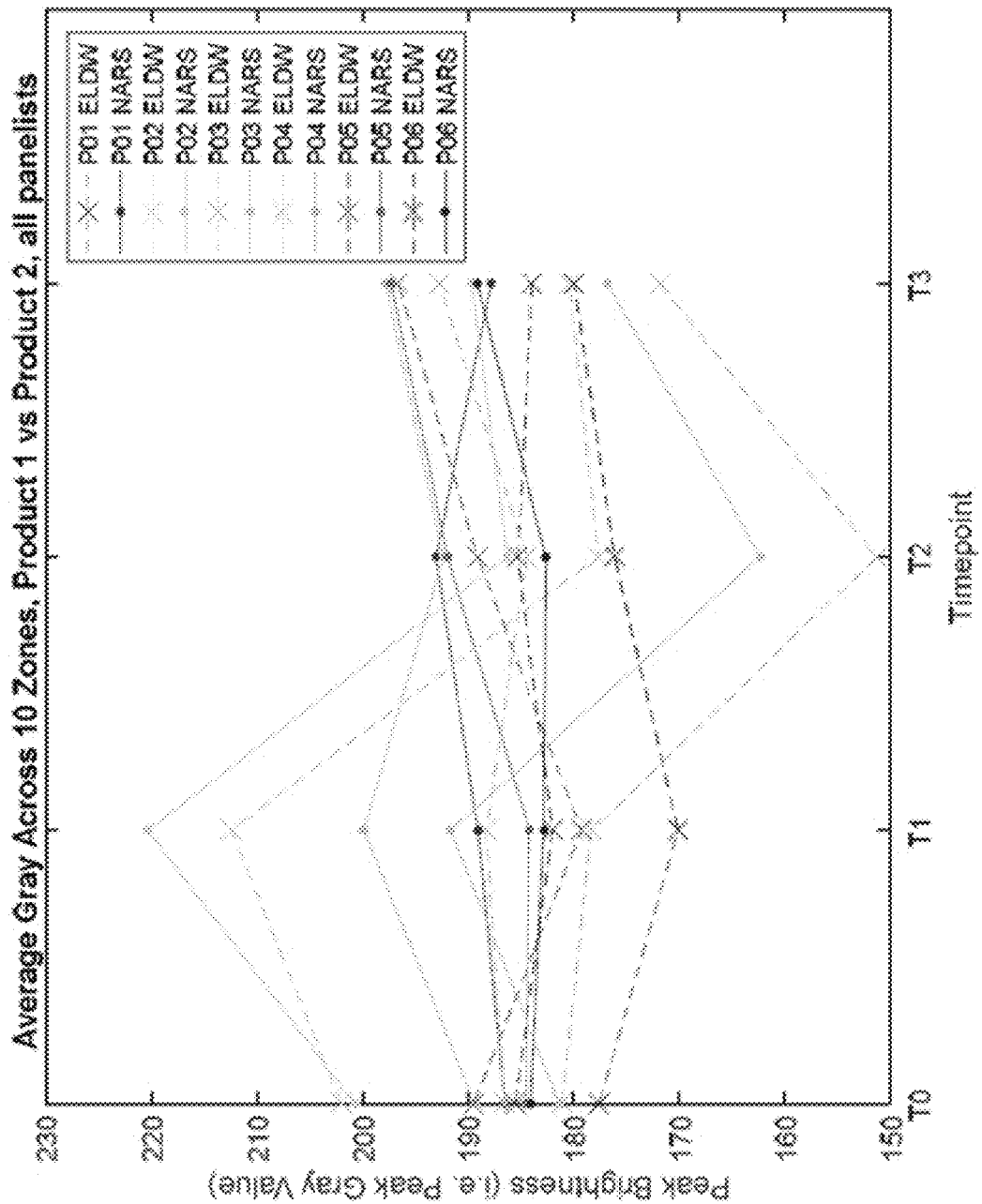
FIG. 10A shows the peak brightness versus timepoint graph obtained using a iPhone 8 camera for all the panelists in a study, where each panelist had a first product known to have a higher peak brightness (NARS) on one half of their face, and a second product known to have a lower peak brightness (ELDW) on the other half of their face.
Figure 10B:
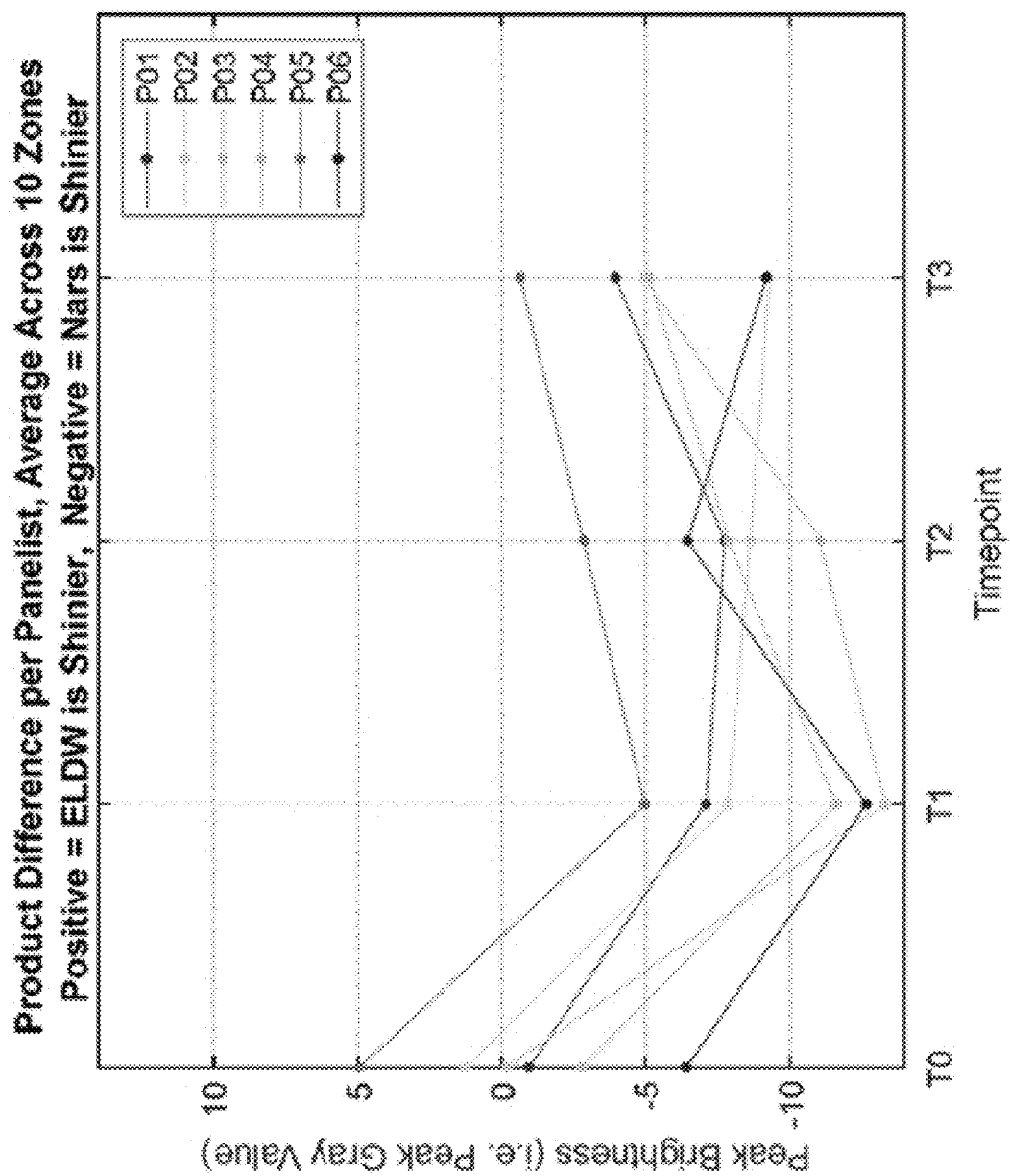
FIG. 10B shows a peak brightness product difference graph obtained using a iPhone 8 camera for all panelists in a study, where each panelist had a first product known to have a higher peak brightness (NARS) on one half of their face, and a second product known to have a lower peak brightness (ELDW) on the other half of their face.

The calculated peak-brightness results across all the zones, per panelist, per time-point, using video acquired by a Panasonic GH5 on a tripod are shown in FIG. 9A, and the corresponding peak-brightness product difference is shown in FIG. 9B. The calculated peak-brightness results across all the zones, per panelist, per time-point using video acquired by an iPhone (by hand i.e. self-acquired by panelist) are shown in FIG. 10A (each curve represents a side of a face), and the corresponding peak-brightness product difference is shown in FIG. 10B (each curve represents a panelist). For the video captured by both the Panasonic GH5 and iPhone, the results showed that for every panelist, NARS had a higher peak-brightness than ELDW. There is also a consistent evolution in the peak-brightness difference, where the NARS is initially much shinier than ELDW at T1, and then evolves closer to the ELDW at T2 and T3. This consistency is not found in the Samba results.

Figure 11A:
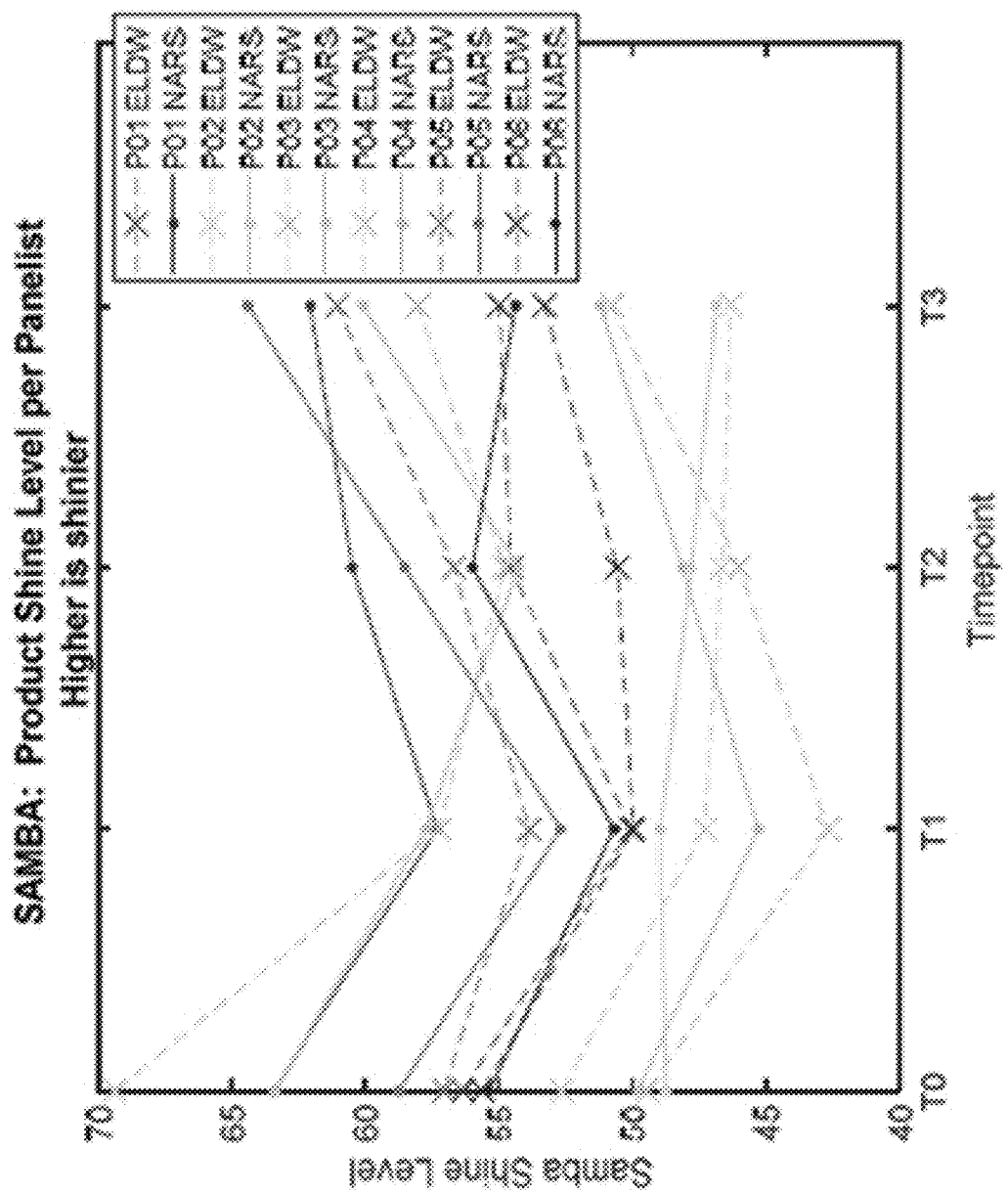
FIG. 11A shows the shine level versus timepoint graph obtained using a Samba for all the panelists in a study, where each panelist had a first product known to have a higher peak brightness (NARS) on one half of their face, and a second product known to have a lower peak brightness (ELDW) on the other half of their face.
Figure 11B:
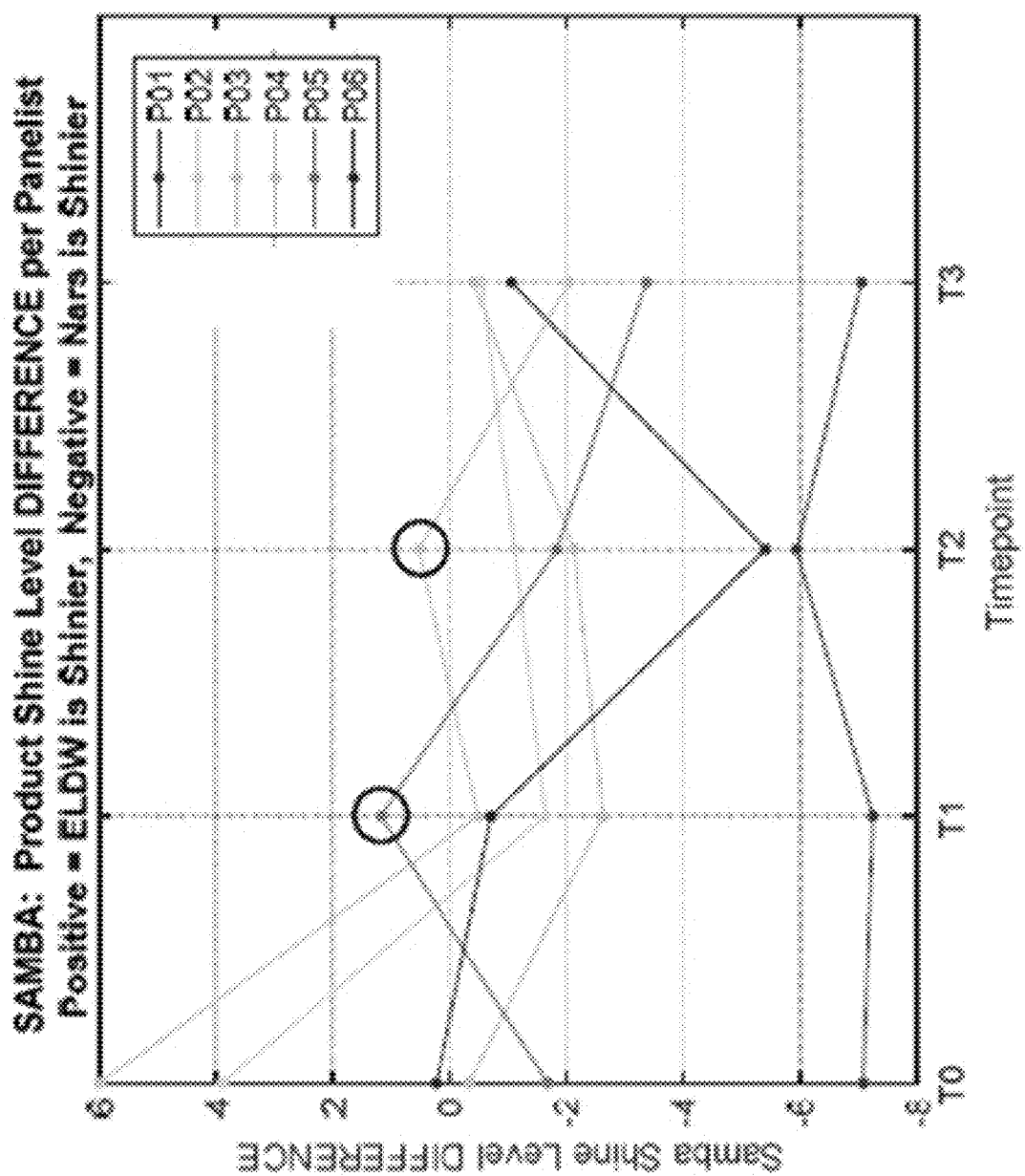
FIG. 11B shows a shine level product difference graph obtained using a Samba for all panelists in a study, where each panelist had a first product known to have a higher peak brightness (NARS) on one half of their face, and a second product known to have a lower peak brightness (ELDW) on the other half of their face.

The shine results per panelist, per time-point, using the Samba are shown in FIG. 11A, and the corresponding shine level difference per panelist, per time-point is shown in FIG. 11B. Note that the Samba shine levels for panelists #3 and #5 are higher for ELDW than NARS at T1 and T2, respectively (both circled in FIG. 11B). Overall, the Samba shine levels are less regular than the peak brightness data shown in FIG. 9A, FIG. 9B, FIG. 10A, and FIG. 10B.

The product difference graphs are summarized in FIG. 12 for side-by-side comparison, where (A) is from the Samba, (B) is the Face-Video system with self-acquired iPhone video, and (C) is the Face-Video system with Panasonic GH5 camera on a tripod. A much clearer evolution of shine is seen coming from the two face-video systems than Samba. The Face-Video system results showed that the NARS-applied sides of the face are more consistently shinier (i.e. negative product difference) than the Samba results—whether using an iPhone with self-acquisition or a prosumer camera on a tripod. These shine-difference curves can translate to a superior discrimination power of any statistical test.

As shown in FIG. 13, a Paired T-Test (N=6) was used to compare each instrument's data from NARS and ELDW. Statistics show that the Face-Video System using peak-brightness from self-acquired iPhone video is able to discriminate between the two products, NARS and ELDW, at every time point, and at very low p-values. This is essentially the same statistical strength as the Face-Video System using a firmly-supported and more-advanced Panasonic GH5 camera. However, the Samba failed to discriminate between NARS and ELDW at T1 and T3.

Thus, the Face-Video System—with a GH5 camera—showed that it can discriminate between shine performance at a statistical confidence never seen with the state-of-the-art, despite being cheaper, smaller, non-contact, more-consumer-relevant, and easier to use. Further, the same superior level of discrimination is also produced when using average smartphone video, which is self-acquired by the test subjects.

During the experiment, the Apple iPhone 8 was running Pro Camera by Moment and had camera settings: 720p @ 60 fps, ISO22 (lowest), 1/60 s shutter (slowest for 60 fps). The Panasonic GH5 was on a tripod, approximately 50 centimeters from the subject, white balance corrected to XRite Graycard (reverse side of XRite Video Colorchecker), ISO200, All-I Frame Compression 200 mbps. The subject had a pneumatic stool that can spin, rise, and fall. There was a green screen backdrop with compact fluorescent lamp (CFL) illumination, approximately 6000K, approximately 100 centimeters behind the subject's head. There was a Bescor LED light (approximately 6000K) and Sekonic Light and Color Meter measured light in front of face as 6200K. The panelist ID and randomly assigned product applied to the left and right side of their face during the experiment are shown in FIG. 14.

In one exemplary embodiment, the above mentioned techniques can be applied to change an environment based on the color of someone's facial features (e.g. a customer). For example, a customer may enter a store looking for lipstick makeup, and the shelves can change color to match the customer's skin tone. As another example, a customer can enter a flagship store, and a wall can change colors to match their face. The benefits of this can include being able to pick color makeup products easily, a celebration of skin tone, and a generation of marketing buzz, such as showing how advanced or unique the store is, for example. As another example, a customer can enter a flagship store and a robotic sculpture can change its shape to reflect their color makeup look; this allows the customer to observe their face from multiple angles, like how others would see them.

In one embodiment, the above mentioned techniques can be performed at home (e.g. using a smartphone) or at a vendor (e.g. using a DSLR camera); this could be done in real-time (e.g. optical properties are calculated nearly simultaneously as the video is captured), or for a pre-existing video (i.e. optical properties are calculated for a video that was recorded in the past).

In another embodiment, the above mentioned techniques can be used to create a database comprising collected data on the calculated optical properties of the skin from different users. This database could be used for data analysis. This data could be further organized by other characteristics such as age, region, gender, etc. For example, for trend analysis, gathering data on the optical properties of social media influencers (e.g. from their social media posts) can lead to insight on trends, such as the popularity of particular makeup styles for certain age groups, a particular lipstick color in a certain region of the world, etc. Findings from the data analysis can be used to create business ideas and make better business decisions, such as being able to identify trends.

The method and system described herein can be implemented in a number of technologies but generally relate to processing circuitry. In one embodiment, the processing circuitry is implemented as one of or as a combination of: an application specific integrated circuit (ASIC), a field programmable gate array (FPGA), a generic array of logic (GAL), a programmable array of logic (PAL), circuitry for allowing one-time programmability of logic gates (e.g., using fuses) or reprogrammable logic gates. Furthermore, the processing circuitry can include a computer processor and having embedded and/or external non-volatile computer readable memory (e.g., RAM, SRAM, FRAM, PROM, EPROM, and/or EEPROM) that stores computer instructions (binary executable instructions and/or interpreted computer instructions) for controlling the computer processor to perform the processes described herein. The computer processor circuitry may implement a single processor or multiprocessors, each supporting a single thread or multiple threads and each having a single core or multiple cores. The processing circuitry used to train the artificial neural network need not be the same as the processing circuitry used to implement the trained artificial neural network that performs the image denoising described herein. For example, processor circuitry and memory may be used to produce a trained artificial neural network (e.g., as defined by its interconnections and weights), and an FPGA may be used to implement the trained artificial neural network. Moreover, the training and use of a trained artificial neural network may use a serial implementation or a parallel implementation for increased performance (e.g., by implementing the trained neural network on a parallel processor architecture such as a graphics processor architecture).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A system for analyzing optical properties of skin, comprising:
   processing circuitry configured to:
      capture video of the skin;
      track, from the captured video of the skin, a plurality of landmarks on the skin;
      identify, from the tracked plurality of landmarks on the skin, one or more regions-of-interest;
      transform the captured video into an angular domain by comparing distances between a first landmark on a left side of the skin relative to a central axis and a second landmark on a right side of the skin relative to said central axis;
   calculate optical properties of the skin; and
   change an environment based on the calculated optical properties of the skin.

2. The system of claim 1, wherein the optical properties include at least one of color, luminance, texture, shine, radiance, evenness, skin tone, iridescence, and glow.

3. The system of claim 1, wherein the video is captured from a handheld device.

4. The system of claim 1, wherein the skin is on a face.

5. The system of claim 1, wherein the optical properties are calculated for a pre-existing video.

6. The system of claim 1, further comprising:
   collecting the calculated optical properties of the skin for data analysis.

7. A method for analyzing optical properties of skin, comprising:
   capturing video of the skin;
   tracking, from the captured video of the skin, a plurality of landmarks on the skin;
   identifying, from the tracked plurality of landmarks on the skin, one or more regions-of-interest;
   transforming the captured video into an angular domain by comparing distances between a first landmark on a left side of the skin relative to a central axis and a second landmark on a right side of the skin relative to said central axis; and
   calculating optical properties of the skin; and
   changing an environment based on the calculated optical properties of the skin.

8. The method of claim 7, wherein the optical properties include at least one of color, luminance, texture, shine, radiance, evenness, skin tone, iridescence, and glow.

9. The method of claim 7, wherein the video is captured from a handheld device.

10. The method of claim 7, wherein the skin is on a face.

11. The method of claim 7, wherein the optical properties are calculated for a pre-existing video.

12. The method of claim 7, further comprising:
   collecting the calculated optical properties of the skin for data analysis.

* * * * *